United States Patent [19]
Daloz

[11] 3,747,724
[45] July 24, 1973

[54] BELT-TYPE CLUTCH COUPLING

[75] Inventor: Jacques Maurice Daloz, Lons le Saunier, France

[73] Assignee: Etablissements Daloz, Lons le Saunier, France

[22] Filed: Nov. 30, 1971

[21] Appl. No.: 203,147

[52] U.S. Cl. ............ 180/75, 74/665 GE, 287/53.04
[51] Int. Cl. ............................................. B60k 17/02
[58] Field of Search .............................. 180/70, 75; 74/665 GE, 650, 710; 192/49; 287/53.03, 53.04

[56] References Cited
UNITED STATES PATENTS
2,591,746  4/1952  Tom .................................. 180/70 R
3,202,017  8/1965  Vance ............................... 74/650 X
2,823,560  2/1958  Harp et al. ...................... 74/655 GE Primary Examiner—Gerald M. Forlenza
Assistant Examiner—George H. Libman
Attorney—Karl F. Ross

[57] ABSTRACT

A belt-type clutch coupling comprising a driven grooved pulley consisting of a pair of flanges each rigid with one of a pair of coaxial shafts each carrying one of the wheels of the machine, and a driving pulley rigid with a power shaft parallel to said coaxial shafts and connected through a transmission belt to said driven pulley, means being provided for tensioning or slackening said belt and therefore rotatably connecting said driving pulley to said pair of flanges, or releasing completely said flanges and therefore the wheels.

5 Claims, 6 Drawing Figures

Patented July 24, 1973 3,747,724

BELT-TYPE CLUTCH COUPLING

FIELD OF THE INVENTION

The present invention relates to belt-type clutch couplings intended more particularly for engaging and disengaging the drive notably but not exclusively in power or motor mowing machines, small motor scythes or harvesters, small motor-cultivators, or like machines.

DESCRIPTION OF THE PRIOR ART

Couplings of this general type must meet as a rule two essential requirements:

—Firstly, in the engaged position, the coupling must transmit the drive to the two wheels of the machine under operative conditions so as to drive same along a rectilinear path, —Secondly, in the disengaged position, leave the two wheels free and independent of each other to impart the maximum flexibility of manoeuver of the machine in all directions.

In hitherto known machines of this character this result is obtained by resorting to complicated and therefore fragile and expensive mechanisms, comprising as a rule dog clutches, or one or more friction clutches.

These devices constitute a substantial fraction of the total cost of these machines, and therefore most manufacturers are inclined to provide drives comprising only very simple clutch means thus precluding the possibility of disengaging the wheels from each other.

SUMMARY OF THE INVENTION

It is the essential object of this invention to avoid the inconveniences of prior art power mowers and like machines by providing a clutch coupler of the belt type which is particularly simple but permits nevertheless the disengagement of the wheels from each other, this device being extremely economical, sturdy and very simple to construct and operate.

The belt-type clutch coupling according to this invention comprises a driven grooved pulley consisting of a pair of separate registering flanges each rigidly connected to one of a pair of coaxial shafts each carrying one of the driven wheels of the machine, and a driving grooved pulley rigid with a power shaft parallel to the coaxial shafts, the driving pulley being connected to the driven pulley through a transmission belt, means for either tensioning the belt and therefore transmitting the drive through the belt from the driving pulley to the pair of flanges constituting the driven pulley, or slackening said belt so as to free completely the flanges and therefore the wheels connected thereto.

Thus, in the disengaged position, each wheel is rotatably free and independent, so that the machine can be handled very easily, for instance for making short-radius turns or for pivoting on the spot, effortlessly.

According to a simplified embodiment of this invention, one of the coaxial shafts supporting the drive wheels is a transverse shaft extending throughout the width of the chassis of the machine, the shaft being carried by a pair of coaxial bearings rigidly supported by the chassis and having secured at one end, one of the aforementioned wheels and at an intermediate position one of said flanges of the driven pulley, the other coaxial shaft consisting of a tubular member receiving the first shaft coaxially therein and extending through the bearing most remote from the wheel carried by the first shaft, the tubular shaft carrying at its outer end the other wheel of the machine and at its inner end, adjacent to the first flange of the driven pulley which is secured to said first shaft, the other flange of the pulley.

According to an embodiment of this invention, the means for tensioning or slackening the transmission belt comprise a member having two spaced bearings having parallel axes. One of these bearings is adapted to pivot freely in a stationary bearing carried by the chassis of the machine and carrying a lay shaft parallel to the wheel axis of the machine and connected to the power means of the machine. The other bearing of said member supports a secondary shaft parallel to the lay shaft the secondary shaft, has secured to one end, a toothed wheel in constant meshing engagement with a pinion rigid with or cut in the lay shaft and, secured to the other end, the driving pulley; means is provided for moving the two-bearing member to the belt-tensioning or belt-slackening position.

According to a modified embodiment of the device according to the invention, a belt-tension roller is rotatably carried by the free end of a pivoting arm or jockey for momentarily tensioning the belt.

Preferably, the belt provided for transmitting the drive to the driven pulley is a conventional V-belt and the two pulleys have corresponding grooves.

BRIEF DESCRIPTION OF THE DRAWING

The attached diagrammatic drawing illustrates by way of example a typical form of embodiment of the clutch coupling device of this invention in the specific case of a small farming machine. In the drawing.

DESCRIPTION OF THE PREFERRED EMBODIMENT

Figure 1:
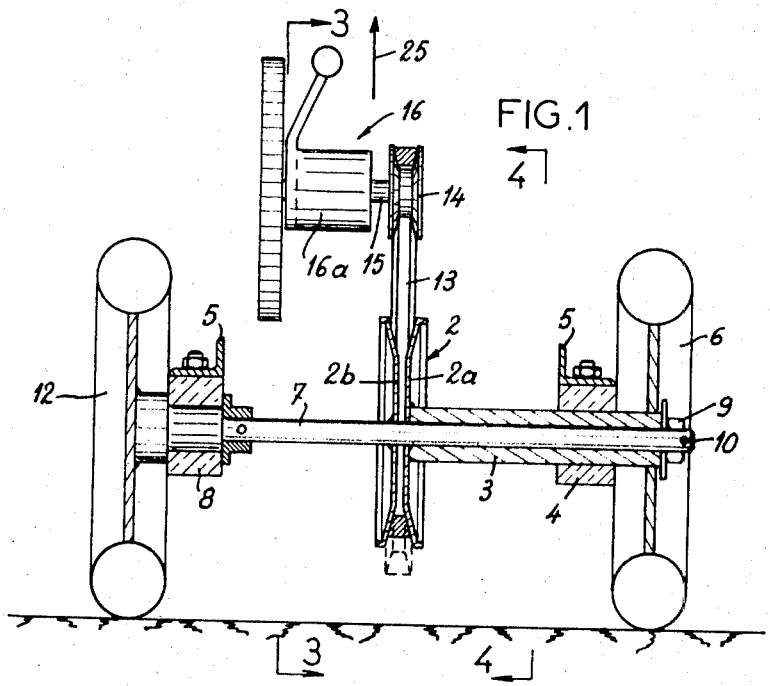
FIG. 1 is a front elevational view of the device overlying the driven axe of the machine ; various parts are shown in axial vertical section.
Figure 2:
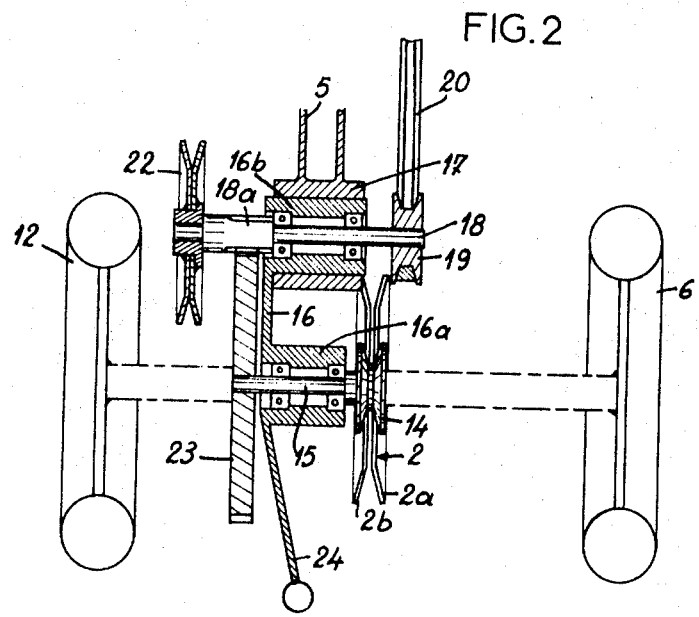
FIG. 2 is a plan view from above with an horizontal axial section taken through the member incorporating the two bearings.
Figure 3:
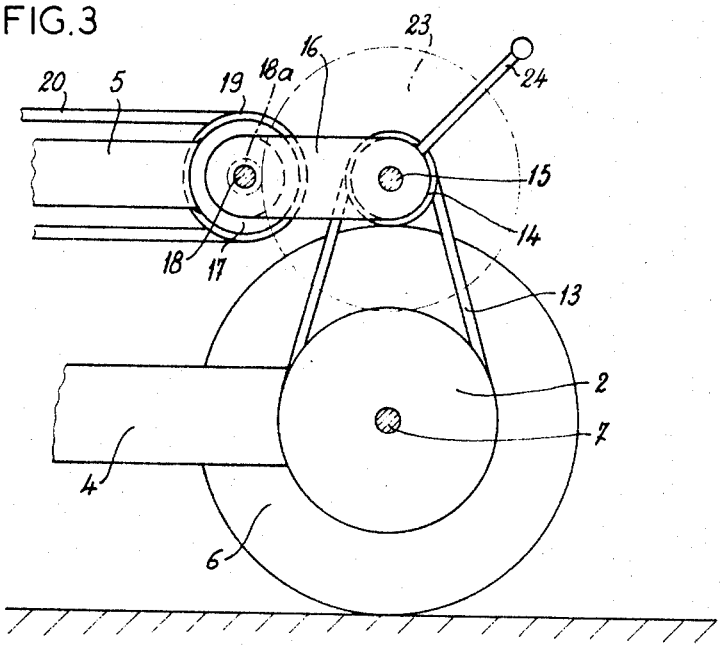
FIGS. 3 and 4 are cross-sectional views taken along lines III — III and IV — IV of FIG. 1.
Figure 4:
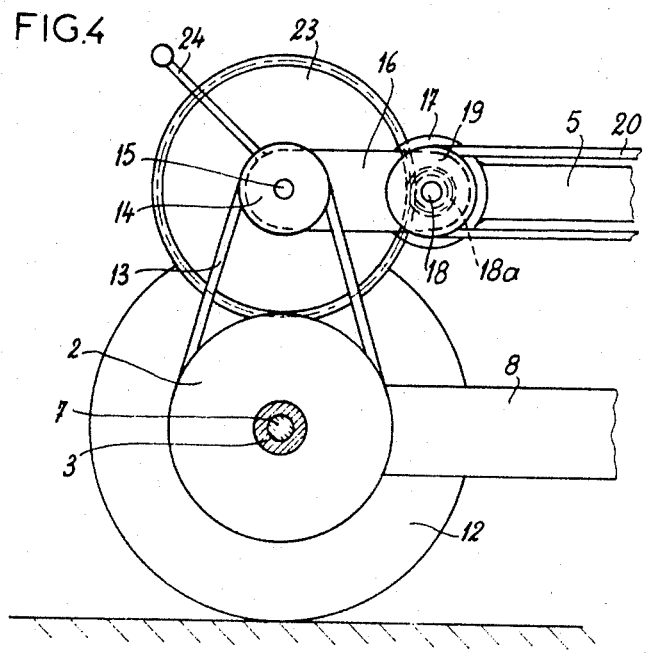

The device illustrated in the drawing comprises a driven pulley 2 consisting of a pair of coaxial, parallel flanges 2a, 2b independent of each other.

Flange 2a is welded to one end of a tubular cylindrical shaft 3 carried by a bearing 4 rigid with the chassis 5 of the machine. This tubular shaft 3 carries at its opposite end one of the wheels 6 of the machine.

The flange 2b is welded to the intermediate portion of a solid cylindrical shaft 7 carried by a bearing 8 rigid with the chassis.

One end of this shaft 7 extends longitudinally through the tubular shaft 3 and projects somewhat from the end of shaft 3 that carries the wheel 6, so as to be engaged by a fastening member such as a nut 9 locked by a cross pin 10. The other end of shaft 7 carries the other wheel 12 of the machine.

It is clear that under these conditions each assembly comprising the wheel 6, shaft 3, flange 2a on the one hand and wheel 12, shaft 7 and flange 2b on the other hand, can rotate freely in relation to the other assembly.

The driven pulley 2 is connected through a transmission belt 13 to an intermeddiate pulley 14 rigid with a lay shaft 15 driven for continuous rotation.

This lay shaft 15 parallel to the aforesaid coaxial shafts 3 and 7 is carried by a bearing 16a fitted in a member 16 comprising another parallel bearing 16b mounted for free rotation in a stationary bearing 17 rigid with the chassis 5.

Journalled in bearing 16b is a secondary shaft 18 carrying at one end a groove pulley 19 connected through a belt 20 to the output shaft of the power unit or engine of the machine. The other end of secondary shaft 18 has a greater diameter as shown at 18a, and this larger portion has gear teeth cut therein. The outer end of this portion carries another grooved pulley 22 connected through a suitable belt to the working tool or equipment (not shown) consisting for example of a movable cutting blade or the like.

The gear teeth or pinion 18a are adapted to drive the lay shaft 15 through a toothed wheel 25 rigid with this lay shaft and in constant meshing engagement with pinion 18a, irrespective of the position of member 16. An arm 24 is provided for moving said member 16 angularly upwards or downwards, together with known and suitable means for retaining this member in its upper or lower position, as required.

This device operates as follows :

Shaft 18 driven continuously by the belt 20 drives in turn the lay shaft 15 through pinion 18a and toothed wheel 23. The driving pulley 14 is thus driven for continuous rotation and the belt 13 associated the rewith is also driven continuously.

In the clutch release position, as illustrated in dash lines at the bottom of FIG. 1, the belt 13 is slackened and cannot drive the driven pulley 2. As a result, the wheels 6 and 12 of the machine are not driven and can revolve in any direction and independently of each other.

For driving both wheels 6 and 12 simultaneously, it is only necessary to pivot member 16 about its axis in bearing 17, in the direction of the arrow 25 (FIG. 1). In fact, this pivotal movement is attended by the tensioning of belt 13, whereby the latter engages the groove of pulley 2 and causes the simultaneous coupling and driving of flanges 2a and 2b, and therefore of the wheels 10 and 12 associated therewith.

As can be seen from FIG. 1, the belt may have a trapezoidal cross-sectional contour.

Figure 5:
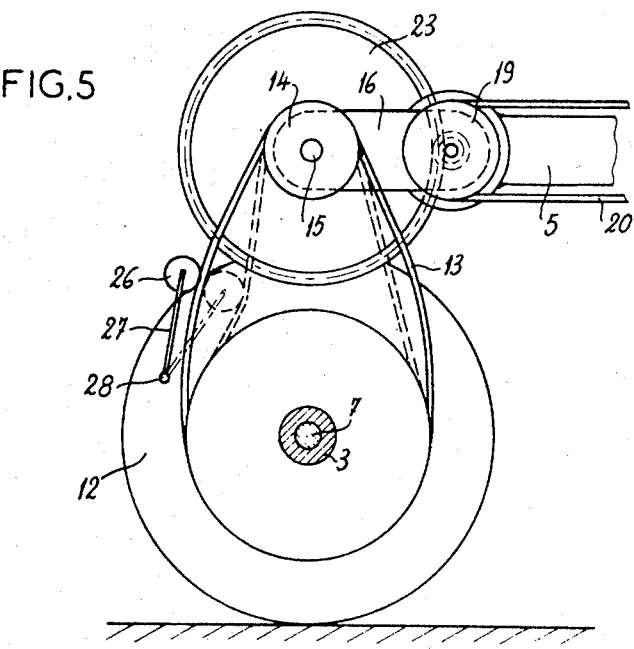
FIG. 5 is a side-elevational view similar to FIG. 4 but showing another means for modifying belt tension.
Figure 6:
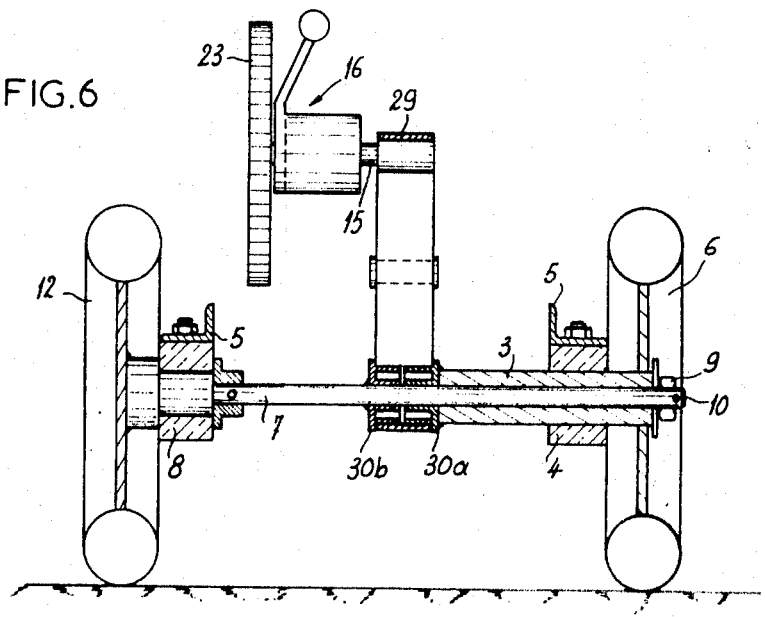
FIG. 6 is a front-elevational view, partially in section, showing an embodiment of the invention using a flat belt.

The means for applying tension to the belt 13 or to effect relaxation thereof may differ from those described above and the belt may have, as illustrated in FIG. 6, a rectangular contour. In the system of FIG. 5, for example, the tension control device includes a tension roller or jockey 26 mounted at the free end of an arm 27 pivoting at 28 for tensioning or slackening the belt, the alternate positions of the tensioning or slackening device being represented in solid lines and in broken lines in FIG. 5. Alternatively, I may provide the shaft 15 above the pulley 2 so that the belt is disengaged automatically under its own weight when the clutch is released. However, other arrangements are also possible, including the use of guide means for assuring this disengagement.

What is claimed as new is:

1. A belt-type clutch coupling, notably for driving a small farming power machine comprising a chassis, a power unit and an axle both mounted on said chassis, said axle comprising two wheels rigid with separate coaxial shafts each mounted in a bearing secured to said chassis, one of said coaxial shaft extending throughout the width of the chassis, the other coaxial shaft being a tubular member receiving one portion of said first shaft concentrically therein and extending from the relevant wheel to an intermediate point of said first shaft, each coaxial shaft being rigid at said intermediate point with a separate flange, said flanges being so disposed as to register with each other and constitute the driven pulley of said axle, means for preventing said coaxial shafts from moving axially in relation to each other, a member comprising two spaced, parallel bearings being pivotally mounted in said chassis above said axle, one of the bearings of said member constituting the pivotal mounting of said member in said chassis and having journalled therein a lay shaft of which the two ends project from said member, one end of said lay shaft being rigid with a pulley driven by said power unit, the other end of said lay shaft being cut to constitute a pinion, the other bearing of said member carrying another secondary shaft parallel to said lay shaft and rigid at one end with a toothed wheel in constant meshing engagement with said pinion and at the opposite end with a driving pulley, a transmission belt disposed in the grooves of said driving and driven pulleys, and means for controlling said two-bearing member so as to lock same either in a position tensioning said belt and transmitting the drive to said wheels, or in a position slackening said belt and permitting the free and independent rotation of said wheels.

2. A belt-type clutch coupling as set forth in claim 1, wherein a belt-tensioning roller carried by the free end of a pivotally mounted arm is provided for momentarily tensioning said belt.

3. A belt-type clutch coupling as set forth in claim 2, wherein said belt has a triangular cross-sectional contour.

4. A belt-type clutch coupling as set forth in claim 2, wherein said belt has a trapezoidal cross-sectional contour.

5. A belt-type clutch coupling as set forth in claim 2, wherein said belt has a rectangular cross-sectional contour.

* * * * *

UNITED STATES PATENT OFFICE
CERTIFICATE OF CORRECTION

Patent No. 3,747,724     Dated 24 July 1973

Inventor(s) Jacques Maurice DALOZ

It is certified that error appears in the above-identified patent and that said Letters Patent are hereby corrected as shown below:

In the heading of the Patent, before line "[52]" insert:

--[30] FOREIGN APPLICATION PRIORITY DATA

4 December 1970 France 70 44 620--

Signed and sealed this 19th day of February 1974.

(SEAL)
Attest:

EDWARD M. FLETCHER, JR.
Attesting Officer

C. MARSHALL DANN
Commissioner of Patents